United States Patent [19]

Hindersinn et al.

[11] 3,909,483

[45] Sept. 30, 1975

[54] TACK FREE POLYMERIZABLE POLYESTER COMPOSITIONS

[75] Inventors: Raymond R. Hindersinn, Lewiston; Jeffrey E. Selley, Amherst, both of N.Y.

[73] Assignee: Hooker Chemicals & Plastics Corporation, Niagara Falls, N.Y.

[22] Filed: Apr. 9, 1974

[21] Appl. No.: 459,749

Related U.S. Application Data

[63] Continuation-in-part of Ser. No. 260,937, June 8, 1972, abandoned.

[52] U.S. Cl. .............................. 260/40 R; 260/861
[51] Int. Cl.² ......................................... C08L 67/06
[58] Field of Search .................................... 260/861

[56] References Cited
UNITED STATES PATENTS

| | | |
|---|---|---|
| 2,856,378 | 10/1958 | Lundberg ........................ 260/861 X |
| 3,227,665 | 1/1966 | Fourcode et al. ................. 260/861 X |
| 3,285,995 | 11/1966 | Nametz et al. .................... 260/869 X |
| 3,668,178 | 6/1972 | Comstock et al. ................ 260/861 X |
| 3,736,278 | 5/1973 | Wada et al. ....................... 260/861 X |

FOREIGN PATENTS OR APPLICATIONS

| | | |
|---|---|---|
| 48-00985 | 1/1973 | Japan |

*Primary Examiner*—Donald E. Czaja
*Assistant Examiner*—S. M. Person
*Attorney, Agent, or Firm*—Peter F. Casella; James F. Mudd

[57] ABSTRACT

Polymerizable polyester compositions containing a saturated polyester having terminal carboxylic acid groups and an hydroxyl number of less than about 10 are provided which compositions are free from tackiness in the uncured state and which on curing are resistant to shrinkage and have improved surface smoothness. The compositions are useful as sheet molding compounds.

21 Claims, No Drawings

TACK FREE POLYMERIZABLE POLYESTER COMPOSITIONS

REFERENCE TO PRIOR APPLICATION

This is a continuation-in-part of copending application Ser. No. 260,937, filed June 8, 1972, now abandoned.

BACKGROUND OF THE INVENTION

The present invention relates to improvements in the art of preparing moldable reinforced polyesters characterized by being tack free and by little or no tendency towards shrinkage during the curing thereof, and to polyester compositions which when cured produce molded articles having superior surface smoothness, that is "low profile" or little variation in surface smoothness. More particularly it relates to polymerizable polyester compositions comprising a compatible mixture of an $\alpha,\beta$-unsaturated polyester, and $\alpha,\beta$-ethylenically unsaturated monomer copolymerizable therewith and a saturated polyester containing terminal carboxylic acid groups, and having a hydroxyl number of less than about 10.

It has long been known to prepare linear polyesters by the reaction of dihydric alcohols an ethylenically unsaturated dicarboxylic acids and that such unsaturated polyesters are capable of addition polymerization with unsaturated monomers to form thermoset polymers. These types of copolymers are widely disclosed in this art, for example, in U.S. Pat. No. 2,255,313 to Ellis, and others.

It is known also to admix such linear ethylenically unsaturated polyesters with ethylenically unsaturated monomers, such as styrene, and to heat the resulting mixture, in the presence of a catalyst, such as a free radical generating substance, to effect copolymerization. This type of reaction has been discussed in numerous patents including that of Ellis, mentioned above, and in the scientific literature e.g., Industrial and Engineering Chemistry, December 1939, page 1512.

It has been suggested to add to the above mixture of unsaturated polyester and copolymerizable monomer, an unpolymerizable or saturated linear polyester which mixture can be polymerized or cured to a substantially infusible state and thereby to produce products of improved tensile and flexural strengths, see for example U.S. Pat. No. 2,856,378 to Lundberg.

Such polyester compositions are often reinforced with fillers such as fiber glass either in the form of rovings or mats and the molded products prepared therefrom have found extensive application in industry for example in four panels for, or portions of, automotive bodies, for appliance shells, boat hulls and the like.

However in the formation of shaped articles with such reinforced plastic composition, difficulties arise because the fibers initially immersed within the uncured liquid resin tend to protrude from the surface causing the object, after molding and curing of the resin, to have irregularities on the surface. Moreover, when the compositions gel to form thermoset cured compositions shrinkage occurs, and the cured piece often develops very small cracks or "microcracks". Such shrinkage, microcracks, and surface irregularities are particularly undesirable where a molded article having a very smooth surface is required. Shrinkage results in the separation of minute areas of the surface of the cured product from the mold surface, with the result that the surface exhibits minute irregularities or unevenness and is not of the desired smoothness. The molded article fails to accurately reproduce the dimensions and surface characteristics of the mold and results in either rejection of the piece or costly finishing operations, e.g., multiple sanding operations and the like. Such irregularities in surface smoothness is readily determined by a profile examination of the surface and hence molded articles having a truly smooth surface have been termed "low profile" moldings. Moreover, the polymerizable polyester mixture is difficult to handle, being sticky or tacky. Thus, when processed into preformed items such as prepregs, sheet molding compounds or extruded rods, the preformed items are difficult to handle and store due to the tacky nature of the materials.

Various attempts have been made to solve the problems referred to above. Thus the problems caused by separation of the reinforcing fibers from the uncured resin have been reduced by chemical thickening of the uncured resin by the addition of magnesium oxide (U.S. Pat. No. 2,628,209) or calcium or magnesium hydroxide, (U.S. Pat. No. 2,568,331 to Frelette and U.S. Pat. No. 3,431,320 to Baum et al).

Although attempts have been made to decrease the shrinkage which such polymerizable compositions undergo upon curing, for example by incorporating in such compositions thermoplastic additives such as poly(methyl methacrylate), poly(vinylchloride), saturated polyesters having hydroxyl terminal groups and the like, such attempts have not been completely successful. Thus they have either failed to significantly reduce cure-shrinkage or they have imparted to the cured product undesirable physical properties as low hardness, low impact resistance, poor paint adhesion and the like.

Moreover such compositions as indicated above are unsatisfactory for use in the recently developed sheet molding compound technique of molding reinforced plastic materials. In this development, the curable mixture is compressed or preformed between sheets of polyolefin, e.g., polyethylene or polypropylene film, and film stripped from the preformed sheets of the curable polyester compositions just prior to molding. In many instances, the polyolefin film cannot be removed cleanly from the polyester resin sheet due to the tacky nature of the latter, resulting from the inclusion of the hydroxy terminated saturated polyesters. This is highly undesirable since it complicates the removal of the polyolefin film. Inasmuch as it is conventional in this art, to prepare the sheet and store or ship it before molding, this tacky or sticky condition is obviously undesirable.

Accordingly, it is a principal object of this invention to provide polyester compositions suitable for the preparation of low profile molded articles which in the precured state are not tacky.

Other objects and advantages of this invention will be apparent from the following description of the present invention.

SUMMARY OF THE INVENTION

In accordance with the present invention, it has been found that new curable or polymerizable polyester compositions are obtained by admixing components comprising:

1. at least one carboxyl group terminated saturated polyester having a molecular weight of about 2000 to about 25,000 and an acid number of from about 2 to about 40, and a hydroxyl number of less than about 10;
2. at least one $\alpha,\beta$-ethylenically unsaturated polyester of components comprising a diol and an $\alpha,\beta$-ethylenically unsaturated dicarboxylic compound, and
3. an $\alpha,\beta$-ethylenically unsaturated monomer co-polymerizable with said unsaturated polyester, said composition comprising, at least about 5 parts by weight of said saturated polyester and at least about 30 parts by weight of said unsaturated polyester per 100 parts of the mixture of polyesters and monomer.

It has been found, further, that such curable mixtures can be preformed, i.e., sheet molding compounds can be prepared therefrom, which are substantially non tacky. Moreover, such compositions can be ucred with little or no shrinkage upon curing. The curable polyester compositions can be cured in molds to provide molded articles having truly smooth surface characteristics free from microcracks and other surface imperfections.

DETAILED DESCRIPTION OF THE INVENTION

In accordance with the present invention polymerizable polyester compositions are provided which compositions comprise 1. a carboxyl group terminated saturated polyester having a molecular weight of about 2000 to about 25,000, and preferably from about 5000 to about 10,000, and an acid number of about 2 to about 40, preferably about 5 to about 30; and a hydroxyl number of less than about 10, preferably less than about 5;
2. an $\alpha,\beta$-ethylenically unsaturated polyester formed by reacting a diol with an $\alpha,\beta$-ethylenically unsaturated dicarboxylic acid; and
3. an $\alpha,\beta$-ethylenically unsaturated monomer, co-polymerizable with said unsaturated polyester, preferably styrene. The saturated polyester is present in the amount of at least 5 parts by weight of said composition comprising the polyesters and monomer, preferably from about 10 to about 20 parts by weight. The unsaturated polyester is present in the amount of at least 30 parts by weight, preferably from about 30 to about 50 parts by weight, per 100 parts of the mixture of polyesters and copolymerizable monomer.

Preferably, and expecially when the compositions of this invention are to be used for the preparation of sheet moldings compounds an inorganic thickening agent is included. Such thickening agents are known in this art and typical agents include magnesium oxide, calcium oxide, calcium hydroxide, magnesium hydroxide, basic magnesium carbonate and mixtures thereof. Only relatively small amounts of these agents are required, for example from about one half to about 15 parts by weight and preferably from 1 to about 7 parts by weight based on the weight of the mixture of polyesters and monomer. Greater or lesser amounts may be used depending upon the degree of thickening desired.

It is especially desirable and hence preferred to select the polyesters, saturated and unsaturated- so that when admixed with the copolymerizable monomer, the resulting mixture is compatible, prior to curing. Thus, the mixture gives rise to a clear solution, but when cured, in the presence of a free radical catalyst, the cured product is an incompatible mixture, i.e., the cured product becomes opaque. It has been found that polymerizable mixtures of such properties give rise to molded products of superior low profile characteristics.

The compositions of the invention can be mixed with fillers such as calcium carbonate, mold release agents, such as calcium or zinc stearate, free radical polymerization catalysts such as tertbutyl perbenzoate, and glass fibers. The mixture preferably is preformed by compressing between sheets of polyethylene film to prepare the sheet molding compounds. After a requisite period of aging at ambient temperature or above, the preformed sheet molding compound is removed and the polyethylene film can be cleanly stripped from the polymerizable mass.

Alternatively, the filled reinforced mixture can be molded directly in a suitable press as a "bulk molding compound". If desired the molding composition can be extruded through a suitable die as a rod, the extruded rod may be cut into pellets or chips of a desired size and the pellets or chips transferred to a suitable molding press and heated therein under compression to cure the compositions.

As indicated above, when the polymerizable compositions are to be used to prepare sheet molding compounds or extrusions, it is preferred to incorporate into the polymerizable composition an inorganic thickening agent. In this manner, the sheet molding compounds and extrusions are obtained in a non-tacky condition, which permits the polyolefin film to be readily stripped from the compound and provides a non-tacky sheet with good integrity and in general simplifies the handling qualities of the preformed pieces.

The saturated polyesters having terminal carboxyl groups as used in the compositions of the present invention differ from the more conventional saturated polyesters of the prior art. The latter polyesters are generally prepared by reacting one molar equivalent of a dicarboxylic acid with one molar equivalent, or an excess, of a polyol. The condensation is continued until substantially complete reaction is obtained, as indicated by the acid number of the reaction mass, i.e., until an acid number within the range of about 5 to 40, depending on the desired molecular weight, is obtained. This reaction can be indicated by the following general equation

$$\text{HOOC—R—COOH} + \text{HO—R'—OH} \longrightarrow$$
$$\text{HOOC—R—COO—R'—O[OCRCOOR'O]}_n\text{H} + x\text{H}_2\text{O}$$

(R and R' being organic residues of the dicarboxylic acid and polyol, or diol, in this instance, respectively, and $n$ is the number of repetitive polyester units in the chain).

As above indicated, the conventional polyesters of the prior art contain essentially one terminal carboxyl group and one terminal hydroxyl group. As will be obvious to those skilled in this art, by using an excess of diol, the resultant polyester will contain essentially two terminal hydroxyl groups and substantially no terminal carboxyl groups.

The saturated polyesters containing terminal carboxyl groups are obtained by reacting a conventional polyester with sufficient additional polycarboxylic acid or anhydride which may be the same or different polycarboxylic acid used in the preparation of the conventional polyesters, to react with the terminal hydroxyl groups of the polyester. This reaction may be followed by determining the hydroxyl number of the reaction mass. Inasmuch as this reaction rarely goes to completion, it suffices for the purposes of this invention to carry the reaction to the point where the hydroxyl number of the polyester mass is below 10. The reaction may be illustrated by the following general equation

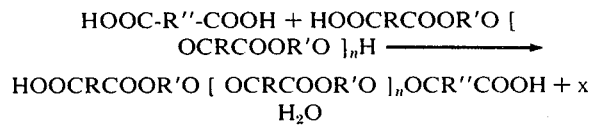

(R'' being an organic residue, the same as or different than R).

As indicated the saturated polyester product is one in which the terminal groups are carboxyl groups, and which contains substantially no terminal hydroxyl groups, as indicated by the extremely low hydroxyl number, i.e., below about 10.

Accordingly, herein, the term "Carboxyl group terminated saturated polyester" is intended to signify saturated polyesters the terminal groups of which are substantially all carboxylic acid groups, and substantial none of which terminal groups are hydroxyl groups. Such saturated polyesters have an average molecular weight of about 2000 to about 25,000, an acid number of about 2 to about 40, and a hydroxyl number of less than about 10.

The saturated polyesters having terminal carboxyl groups are prepared by first reacting substantially molar equivalent amounts of at least one polycarboxylic acid, preferably a dicarboxylic acid, with at least one polyol, preferably a diol, until the hydroxyl number of the reaction mass is within the desired range, preferably from about 20 to about 40. Thereafter the polyester product is reacted with a polycarboxylic acid or anhydride which may be the same or different as that used previously, and preferably is a dicarboxylic acid or anhydride, in sufficient amount to react with substantially all of the terminal hydroxyl groups in the original polyester. The latter reaction is carried out until the hydroxyl number of the reaction mass is less than about 10 and the acid number is within the desired range.

As typical of the diols, aliphatic and aromatic, which can be used to prepare the saturated polyester component of the invention the following are mentioned by way of examples
  ethylene glycol
  propanediol-1,2
  propanediol-1,3
  butanediol-1,4
  hexanediol-1,6
  diethylene glycol
  dipropylene glycol and higher homologues thereof
  neopentyl glycol
  2,2,4-trimethylpentanediol
  oxyalkylated bisphenols, such as oxyethylated bisphenol A
  dimethylol cyclohexane The diols generally have 2 to about 25 carbon atoms, preferably 2 to about 8 carbon atoms. Mixtures of these and equivalent diols are contemplated also. Further a diol as exemplified above in admixture with minor amounts, less than about 20 percent by weight of a polyol, such as glycerine, trimethylolpropane, pentaerythritol and the like, can be used also.

The dicarboxylic acids or anhydrides suitable for the preparation of the saturated polyester component of the composition of this invention include the following by way of illustration.
  oxalic acid
  succinic acid
  glutaric acid
  adipic acid
  pimelic acid
  suberic acid
  azelaic acid
  sebacic acid
  o-phthalic acid
  isophthalic acid
  terephthalic acid
  tetrahydrophthalic acid
  hexahydrophthalic acid
  tetrachlorophthalic acid
  tetrabromophthalic acid
  endomethylene tetrahydrophthalic acid ("Nadic Acid")
  methyl endomethyl tetrahydrophthalic acid ("Methyl Nadic Acid")
  hexachloroendomethylene tetrahydrophthalic acid, also known as "chlorendic acid" and similar compounds disclosed in U.S. Pat. No. 2,779,701, which is incorporated herein by reference.

The carboxylic acids generally have 2 to about 20 carbon atoms, preferably 4 to about 12 carbon atoms. Mixtures of these and equivalent dicarboxylic acids are contemplated also. Where available, the anhydrides or acid halides of these and equivalent dicarboxylic acids can be used also.

The unsaturated polyesters as contemplated for use in the compositions of this invention are well known in the art. As is known also such polyesters are derived by reaction of a diol, such as has been defined and illustrated hereinabove and an $\alpha,\beta$-ethylenically unsaturated dicarboxylic acid such as maleic acid, fumaric acid, itaconic acid, citraconic acid, mesaconic acid, aconitic acid, and the like. If desired, the unsaturated polymer can be prepared using the anhydrides, or acid halides, when available, of the above named dibasic acids, or mixtures of these acids and equivalent acids together with the same or different acid or anhydride. It is also contemplated to replace a portion of the unsaturated acid, or anhydride, with one or a mixture of saturated acids such as o-phthalic acid, isophthalic acid, tetrachlorophthalic acid, hexahydrophthalic acid, tetrabromophthalic acid, hexachloroendomethylene-tetrahydrophthalic acid, the anhydrides of such acids if available, and the like. The use of halogenated dicarboxylic acids in this manner is especially desirable since the resultant products possess a high degree of fire retardancy.

The $\alpha,\beta$-ethylenically unsaturated monomer which is copolymerizable with the unsaturated polyester are known in this art and generally contain a $CH_2=C<$ group. Illustrative of the suitable monomers are the following
  styrene
  o-chlorostyrene
  vinyl toluene
  divinyl benzene
  diallyl phthalate diacetone acrylamide
methyl methacrylate
n-butylacrylate
vinyl acetate
vinyl propionate
diallyl fumarate and mixtures of these and equivalent monomers. Of these, styrene is generally to be preferred.

The amount of such monomer used is generally within the range of 10 to 65 percent and preferably within the range of about 20 to about 60 percent by weight of the mixture of polyesters and monomer.

The polyester compositions may contain, as a rule, known inhibitors to prevent premature polymerization, such as p-benzoquinone, 2,5-di-tert-butylquinone, hydroquinone, tert-butyl pyrocatechol, 4-ethylpyrocatechol, copper compounds, hydroxylamine derivatives, and the like.

The mixture of saturated and unsaturated polyesters and monomer may include a thickener, such as for example magnesium oxide, magnesium hydroxide, basic magnesium carbonate and calcium hydroxide. Calcium oxide can be used to replace a portion of the hydroxide and when used increases the effectiveness of the thickener, as disclosed in U.S. Pat. No. 3,431,320. The amount of thickener used is not critical and is generally in the range of about 0.5 to about 3 percent of the mixture of polyesters and monomer.

A free radical initiator is used to catalyze the copolymerization of the unsaturated polyester and unsaturated monomer. It is well known to use an organic peroxide to initate the copolymerization and typical examples of such peroxides include tert-butylperbenzoate, benzoyl peroxide, methylethylketone peroxide, lauroyl peroxide, cumene peroxide and the like. Other free radical generating substances, such as 2,2'-azobisisobutyronitrile, can be used, such as disclosed in U.S. Pat. No. 2,255,313, which is incorporated herein by reference.

The polymerizable composition prepared in accordance with this invention contains additional components which are generally conventional in the art of reinforced plastics. Thus fillers such as hydrated aluminum oxide, talcum, clays, chalk, asbestos powder and fibers, quartz powder, kieselguhr and the like, mold lubricants or mold release agents such as calcium and zinc stearate, silicones, and the like, reinforcing materials such as glass fibers, threads and mats, metal fibers, and the like and various mixtures thereof are incorporated by known means in the mixture.

Thus the mixture of unsaturated polyester, saturated polyester, copolymerizable monomer, thickening agent, filler, mold lubricant and catalyst is blended in suitable apparatus, such as a Cowles Dispersator. The resultant liquid mixture is applied by means of a doctor blade to two sheets of polyethylene film and the glass fibers are uniformly deposited on the resin mixture of one of the films and covered with the resin coated side of the other film. After covering the mass, the polyethylene film sandwich is squeezed between corrugated rolls so as to wet the glass fibers with the resin mixture followed by squeezing between smooth rolls. The resultant composition is then rolled on a fiber board core and sealed with aluminum foil backed cellophane film to prevent loss by evaporation of the monomer. After ageing for a sufficient period, e.g., about two or more days at ambient temperature or above, to permit thickening of the mass, the resulting sheet molding compound can be cut into pieces of desired size, the polyethylene film peeled off and molded in a compression press in a known manner.

Surprisingly, it was found that when the saturated polyester components used in this manner were essentially carboxy group terminated saturated polyesters the polyethylene film could be cleanly peeled off of the sheet molding compound, i.e., the compound was not tacky or sticky. In contrast thereto, sheet molding compounds prepared using polyesters containing terminal hydroxyl groups were tacky or sticky, of poor integrity, and the polyethylene film could not be cleanly peeled from the compound.

The improvements in the preparation of the sheet molding compounds and in the low profile molded products prepared therefrom result from the use of the carboxyl group terminated saturated polyesters in particular proportions in conjunction with the thickening agent. As above indicated, it has been found that the polymerizable composition comprising a. a terminal carboxyl group saturated polyester
b. an $\alpha,\beta$-unsaturated polyester
c. and $\alpha,\beta$-ethylenically unsaturated monomer copolymerizable with said unsaturated polyester, and
d. a thickening agent, provides filled sheet molding compounds or bulk molding compounds which are non-tacky in character.

It has further been found that low profile molded articles can be obtained from such sheet molding compounds or directly from the polymerizable compositions of this invention by selecting the polyesters such that the mixture of polyesters and copolymerizable monomer is a compatible mixture prior to curing but upon being cured, i.e., copolymerized in the presence of a free radical initiator, results in an opaque resin product. Such polymerizable compositions result from the admixture of at least 5 parts by weight of said saturated polyester, preferably from about 10 to about 20 parts by weight, with at least about 30 parts by weight of said unsaturated polyester preferably from about 35 to about 70 parts by weight, and about 10 to about 65 parts by weight of said copolymerizable monomer, preferably from about 20 to about 50 parts by weight. (All ranges noted herein are based on 100 parts of the mixture of polyesters with copolymerizable monomer).

Polyester compositions prepared in accordance of the present invention provide not only non-tacky sheet molding compounds and bulk molding compounds but also molded articles which exhibit superior surface smoothness, gloss, substantial freedom from microcracks and internal fissures, improved hardness extremely low shrinkage, and exceptional low profile molded articles.

The following examples illustrate the present invention. In these examples, as well as the above specification and appended claims, all parts and percentages are by weight and temperatures are given in degrees centigrade, unless otherwise specified.

In the following examples, surface smoothness was determined using a Bendex Microcorder and flame resistance of the polymer articles was determined according to the Underwriters Laboratories Subject 94 standard test procedure. Hardness was determined using the Barcol Hardness Tester.

EXAMPLE I

A. Preparation of Unsaturated Polyester

A mixture of 790 parts (10.4 mols) of propylene glycol, 882 parts (9.0 mols) of maleic anhydride and 148 parts (1.0 mol) of phthalic anhydride was heated to and maintained at 200° – 210° while agitating the mixture and while passing a slow steady stream of nitrogen gas through the mixture. After about 170 parts of water had distilled from the reaction mixture and the acid number of the mass had fallen to 30 to 35, the heating was discontinued. Following the addition of 0.48 part of toluhydroquinone, the polyester mass was cooled to about 120° and 810 parts (7.8 mols) of styrene were dissolved in the mass. The resulting solution had a Brookfield viscosity of 790 cps at 25°.

EXAMPLE I

B. Preparation of Halogen Containing Unsaturated Polyester

To 1116 parts (14.7 mols) of hot (100°–110°) propylene glycol, 778 parts (2.0 mols) of chlorendic acid and then 1392 parts (12.0 mols) of fumaric acid were added. The agitated mixture, through which a slow steady stream of nitrogen was continuously passed, was heated gradually to and maintained at 165° to 170° until an acid number of 35 to 40 was obtained. Water evolved in the reaction was continuously removed throughout the reaction. The polyester mass was cooled to about 120°, and after the addition of 0.63 part of toluhydroquinone, 1400 parts of styrene were stirred in the mixture.

The resultant liquid unsaturated polyester contained about 10 percent of chlorine and had a viscosity of 1000 cps as measured by a Brookfield viscosimeter at 25°.

EXAMPLE II

Preparation of Carboxyl Terminated Saturated Polyester

An agitated mixture of 163.6 parts (2.64 mols) of ethylene glycol and 158.4 parts (1.76 mols) of 1,4-butane diol was heated to 100° to 110°, while passing a slow steady stream of nitrogen through the mass. Thereafter, 584 parts (4.0 mols) of adipic acid were added to the hot glycol mixture which then was heated to and maintained at about 220° until the acid number of the polyester mixture drops to 20 to 25. Water formed in the reaction distilled from the mass, assisted by the nitrogen gas stream. After the addition of 0.7 part of the tetraisopropyltitanate, the mixture was heated at about 220° and vacuum was gradually applied to assist in the removal of excess glycol and the last traces of water. When the acid number falls to about 1 and the hydroxyl number of the polyester diol product was about 20, the heating of the mixture was interrupted and the vacuum released. A portion, 600 parts, of the polyester was cooled to about 130°, and 28.5 parts (0.241 mol) of succinic anhydride were added. The resultant mixture was maintained at 125° to 130° under a nitrogen pad until the acid number of the mixture was about 18 to 20 and the hydroxyl number was about 5. This required about 1 to 2 hours. Thereafter the carboxyl terminated saturated polyester product was cooled to ambient temperature and at this temperature it was a viscous resinous semi-liquid.

EXAMPLE III

Preparation of Carboxyl Terminated Saturated Polyester

The procedure of Example II above was repeated except that 41.4 parts (0.283 mol) of adipic acid instead of 28.5 parts of succinic anhydride were used to react with the same amount of the polyester diol product. The reaction with adipic acid was carried out at 160° to 170°, instead of 125° to 130°, until the acid number of the polyester mixture was about 18 to 20 and the hydroxyl value of the product was below 10.

In an analogous manner carboxyl terminated saturated polyesters were prepared using substantially equivalent amounts of tetrabromophthalic anhydride, methyl Nadic anhydride, chlorendic anhydride and tetrahydrophthalic anhydride in place of succinic anhydride.

EXAMPLE IV

Preparation of Bulk Molding Compound and Molded Products Therefrom

A mixture of 110 parts of the unsaturated polyester-styrene solution, prepared as described in Example IA above, 30 parts of the carboxyl terminated saturated polyester, prepared as described in Example 2, above, 60 parts of styrene, and 2 parts of tert butyl perbenzoate was prepared in a sigma blade mixer. To this mixture, 400 parts of ground limestone, 2 parts of magnesium hydroxide and 7.5 parts of zinc stearate were added and the mass mixed until uniform. Then 150 parts of ¼ inch chopped glass fibers were blended into the mixture. The resulting bulk molding compound was transferred from the mixer into a polyethylene bag which was placed in a covered container, to prevent loss of styrene, and stored for about 48 hours at ambient temperature. The resultant thickened mass was a non-tacky, easily handled material which did not give any evidence of separation of any component.

A portion (320 Parts) of the bulk molding compound was charged to an 8 in. by 8 in. polished mold containing three ribs and three bosses. The mass was compression molded for 2 minutes at 300° Fahrenheit at 1000 psi.

The resultant molded piece had the following properties

| | |
|---|---|
| Shrinkage | |
|   Side to side | +0.25 mils/inch (expansion) |
|   front to rear | 0.00 |
| Profile | |
|   center | 200 micro inches |
|   over ⅜" rib | 130 micro inches |
| Barcol Hardness | 43 |

EXAMPLE V

Preparation of Sheet Molding Compound and Molded Product Therefrom

A sheet molding compound was prepared using the same mixture of polyesters and adjuvants (fillers, thickener, catalyst and glass fibers) as used in Example IV above.

The polyesters, catalyst, magnesium hydroxide, calcium carbonate, and zinc stearate were blended in a Cowles Dispersator and the blended mixture applied by means of a doctor blade to two sheets of polyethylene film and the chopped glass fibers were laid down on the top of resin mixture so that the mass contained 30 percent 1 inch chopped glass. The polyethylene-resin sandwich was then squeezed between corrugated rollers to wet the glass fibers followed by smooth rollers and the resultant mass was rolled on a fiberboard core. The roll was wrapped in aluminum foil backed cellophane film and sealed to prevent loss of styrene.

The sealed roll was then stored for about 48 hours at 90° to 100°F. The thickened resin mass was then cut into pieces of desired size and the polyethylene film was stripped off cleanly to give leather like non-tacky sheets which could be handled and stacked readily without sticking.

On molding the sheets in the polished mold used in Example IV above, a molded piece was obtained having the following properties

| | |
|---|---|
| Shrinkage | |
| Average side to side and front to rear | 0.0 mils per inch |
| Profile | |
| Center | 60 micro inches |
| over ⅜ in. rib | 200 micro inches |
| Barcol Hardness | 45 |

EXAMPLE VI

Preparation of Fire Retardant Bulk Molding Compound and Low Profile Castings Therefrom A mixture of 140 parts of the chlorine containing unsatureated polyester-styrene composition prepared as described in Example IB above, 35 parts of the carboxyl terminated saturated polyester prepared as described in Example II above, 35 parts of styrene, 2 parts of tert butyl perbenzoate, 7.5 parts of zinc stearate, 2 parts of magnesium hydroxide, 150 parts of alumina hydrate and 4 parts of antimony oxide were blended together in a sigma blade mixer. Thereafter, 125 parts of ¼ inch chopped glass fibers were mixed into the mass which then was removed from the mixer and stored in a sealed polyethylene bag placed in a covered container for about 48 hours at ambient temperature. The resultant bulk molding compound was non-tacky and had good integrity.

On molding in a polished mold as described above, the finished piece was fire retardant as evidenced by its passing the standard UL 94 Flame Test and had the following properties

| | |
|---|---|
| Shrinkage | |
| Side to side | +0.1 mils/inch (expansion) |
| Front to rear | —0.4 mils/inch |
| Profile | |
| Center | 200 micro inches |
| Over ⅜" rib | 370 micro inches |
| Barcol Hardness | 45 |

EXAMPLE VII

Sheet Molding Compound and Molded Product Therefrom Having Fire Retardant Character A sheet molding compound was prepared as described in Example V above, using the following components

| | |
|---|---|
| Unsaturated Polyester-Styrene Composition of Example IB above | 140 parts |
| Carboxyl terminated saturated polyester of Example II | 35 parts |
| Styrene | 35 parts |
| Tert. butyl perbenzoate | 2 parts |
| Hydrated alumina | 250 parts |
| Magnesium Hydroxide | 2 parts |
| Zinc Stearate | 7.0 parts |
| Antimony Oxide | 4.0 parts |
| chopped glass fibers, 1 inch | 110.0 parts |

The sheet molding compound after aging for about 48 hours at 90° to 100°F had good integrity, was leather-like and non-tacky, and the polyethylene film was cleanly and readily removed therefrom.

On molding as described above, the molded specimen passed the UL 94 flame test and had the following properties:

| | |
|---|---|
| Shrinkage | |
| Side to side | —0.2 mils/inch |
| Front to rear | —0.4 mils/inch |
| Profile | |
| Center | 225 microinches |
| Over ⅜" rib | 300 microinches |
| Barcol Hardness | 52 |

EXAMPLE VIII

Preparation of Bulk Molding Compound

A mixture of 140 parts of the unsaturated polyester-styrene composition prepared as described in Example IA above, 20 parts of the carboxy terminated saturated polyester prepared as described in Example III above, 40 parts of styrene, 2 parts of tert. butylbenzoate, 440 parts of ground limestone, 2 parts of magnesium oxide, and 7.5 parts of zinc stearate was blended in a sigma blade mixer. Thereafter, 150 parts of ¼ inch chopped glass fibers were added and the mass mixed until uniform. The mixture was transferred to a polyethylene bag and stored in a closed container for about 48 hours at ambient temperature. The resultant thickened bulk molding compound was non-tacky and had good integrity. It could be handled with relative ease.

On being molded in a compression mold as described above, it yielded molded products of extremely low shrinkage, excellent gloss and acceptable low profile characteristics.

EXAMPLE IX

Preparation of Sheet Molding Compound using Hydroxyl Terminated Saturated Polyesters In this experiment, which is included for comparison, a saturated polyester was used wherein the polyester contained terminal hydroxyl groups. This polyester was prepared as described in Example II above except that following reaction of the polyester with tetraisopropyltitanate and removal of excess glycol and last traces of water, the step of capping the terminal hydroxyl groups with succinic anhydride was omitted.

The sheet molding compound was prepared by blending 140 parts of the unsaturated polyester prepared in Example IA above, 35 parts of the hydroxyl terminated polyester prepared as described above. 35 parts of styrene, 2 parts of tert. butylperbenzoate, 400 parts of ground limestone, 2 parts of magnesium oxide and 6.0 parts of zinc stearate in a Cowles Dispersator. The resulting mixture was laid down on a sheet of polyethylene film, 30 percent of 1 inch chopped glass fibers added to the resin mixture, the mass covered with a second sheet of resin coated polyethylene film and then passed through corrugated rolls and then through smooth rolls. The resultant mass was covered with aluminum backed cellophane film, sealed, and stored for about 48 hours at 90° to 100°F.

On attempting to peel the polyethylene film from the resulting sheet molding compound, the film could not be cleanly removed from the thickened mass, some resin and glass fibers adhering to the polyethylene sheet. The surface of the resin mixture was tacky.

A portion of the resin mixture was molded in a compression molding press at 300°F and 1000 psi for 2 minutes, as described above. The molded specimen had the following properties:

Shrinkage
    Average — front to rear and
        side to side                   +0.06 mils/inch
                                         (expansion)
Profile
    Center                               80 microinches
    Over ⅜" rib                     150 microinches
Barcol Hardness                    25

The results obtained in this comparative example indicate that sheet molding compounds obtained using hydroxy terminated saturated polyesters are tacky and accordingly difficult to handle. Note that the closely analogous composition differing essentially in the use of a carboxy terminated saturated polyester gave non-tacky sheet molding compounds. An additional advantageous result which follows from the use of carboxy terminated saturated polyester is the harder molded products obtained. As indicated above, the molded product obtained using the hydroxyl terminated saturated polyester had a Barcol Hardness of only 25 whereas the molded product obtained using the carboxyl terminated saturated polyester had a Barcol Hardness of 45 (see Example V).

EXAMPLE X

Preparation of Carboxy Terminated Saturated Polyester

The procedure of Example II above, was repeated except that an 800 part portion of the polyester diol product instead of 600 parts thereof, were reacted with 92.8 parts (0.2 mol) of tetrabromophthalic anhydride instead of 28.5 parts of succinic anhydride. The reaction of the polyester diol and anhydride was carried at about 165°, instead of 125° to 130°, until the acid number of the polyester mixture was about 20.2. The resultant carboxyl terminated saturated polyester had a hydroxyl value of 4. The molding compositions prepared from this polyester as in the preceding examples were non-tacky.

While this invention has been described with respect to certain embodiments, these are not intended to limit the scope of the invention, but rather to illustrate the invention.

What is claimed is:

1. A polymerizable polyester composition of components comprising
    1. a carboxy group terminated saturated polyester of a diol and a dicarboxylic compound having a molecular weight of about 2000 to about 25,000, an acid number of about 2 to about 40 and a hydroxyl number of less than about 10,
    2. an $\alpha,\beta$-ethylenically unsaturated polyester of a diol and a $\alpha,\beta$-ethylenically unsaturated dicarboxylic compound, and
    3. an $\alpha,\beta$-ethylenically unsaturated monomer copolymerizable with said unsaturated polyester;

said saturated polyester being present in the amount of at least about 5 parts by weight and said unsaturated polyester being present in the amount of at least about 30 parts by weight per 100 parts by weight of the mixture of polyesters and said copolymerizable monomer.

2. The composition as claimed in claim 1 wherein said saturated polyester has a molecular weight of about 5000 to about 10,000.

3. The composition of claim 2 wherein the saturated polyester has an acid number of about 5 to about 30.

4. The composition of claim 1 wherein the saturated polyester has a hydroxyl number of less than about 5.

5. The composition of claim 1 wherein the saturated polyester is present in the amount of from 10 to about 20 parts by weight per 100 parts by weight of the mixture of polyesters and copolymerizable monomer.

6. The composition of claim 5 wherein the unsaturated polyester is present in the amount of from about 30 to about 50 parts by weight per 100 parts by weight of the mixture of polyesters and copolymerizable monomer.

7. The composition of claim 1 wherein the copolymerizable monomer is present in the amount of about 20 to about 60 parts by weight per 100 parts by weight of the mixture of polyesters and copolymerizable monomer.

8. The composition of claim 7 wherein the copolymerizable monomer is present in the amount of about 20 to about 50 parts by weight per 100 parts by weight of the mixture of polyesters and copolymerizable monomer.

9. The composition of claim 1 wherein the composition also comprises an inorganic thickening agent.

10. The composition of claim 9 wherein the inorganic thickener is selected from the group consisting of magnesium oxide, magnesium hydroxide, basic magnesium carbonate, calcium hydroxide and mixtures thereof.

11. The composition of claim 1 wherein the unsaturated polyester is formed by reaction of a diol and a mixture of a dicarboxylic acid and a chlorine containing dicarboxylic acid.

12. The composition of claim 11 wherein the chlorine containing dicarboxylic acid is chlorendic acid.

13. The composition of claim 12, wherein the chlorendic acid is present in amount sufficient to provide an unsaturated polyester having at least about 10 percent by weight of chlorine.

14. The composition of claim 1 wherein the saturated polyester is obtained by reacting initially a diol with a dicarboxylic acid or anhydride to form a polyester having at least one terminal hydroxyl group and subsequently reacting the initially prepared polyester with an additional quantity of the same or different dicarboxylic acid or anhydride to prepare a carboxyl terminated saturated polyester having a hydroxyl number of less than 10.

15. The composition of claim 14 wherein the dicarboxylic acid used to react with the initially formed polyester is the same dicarboxylic acid used in the initial reaction.

16. The composition of claim 15 wherein the polyester initially formed is the product of reaction of a mixture of ethylene glycol and 1,4-butane diol with adipic acid which then is reacted with an additional quantity of adipic acid.

17. The composition of claim 14 wherein the dicarboxylic acid or anhydride used to react with the initially formed polyester is a different polycarboxylic acid from that used in the initial reaction.

18. The composition of claim 17 wherein the polyester initially formed is the product of reaction of a mixture of ethylene glycol and 1,4-butane diol with adipic acid which polyester is subsequently reacted with succinic anhydride.

19. The composition of claim 17 wherein the polyester initially formed is the product of reaction of a mixture of ethylene glycol and 1,4-butane diol with adipic acid which polyester is subsequently reacted with tetrabromo phthalic anhydride.

20. A thickened non-tacky sheet molding compound comprising a polymerizable polyester composition as defined in claim 1, fillers, an inorganic thickening agent, a free radical generating catalyst and reinforcing glass fibers.

21. A thickened non-tacky sheet molding compound comprising a polymerizable polyester composition as defined in claim 10 and fillers, a free radical generating catalyst and reinforcing glass fibers.

* * * * *